Oct. 29, 1940.　　　E. J. ÖSTERBERG　　　2,219,429
COMPUTING DEVICE
Filed July 26, 1938
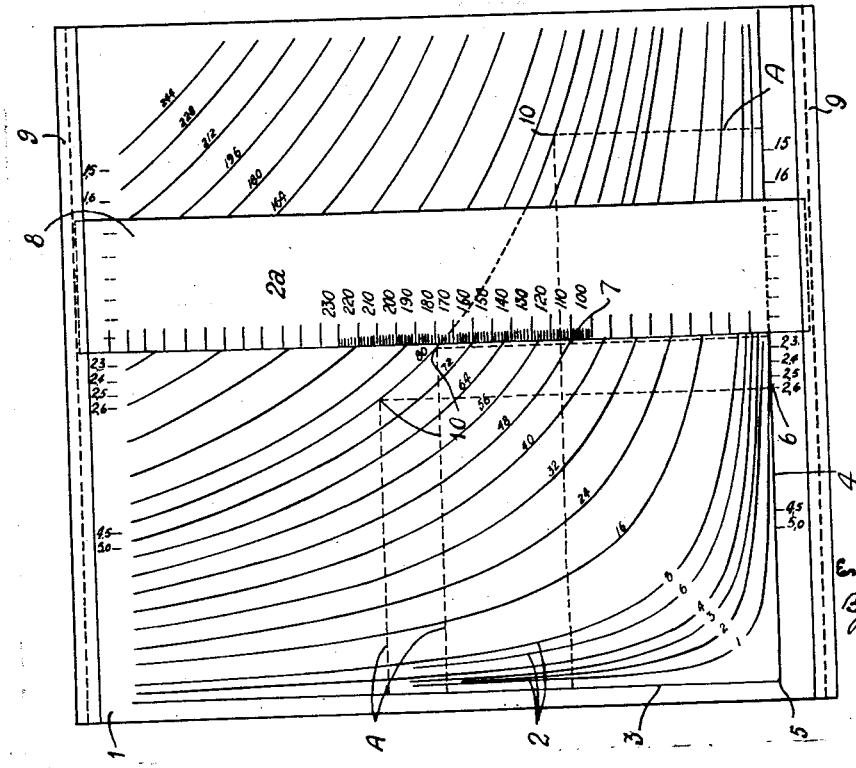
Inventor:
Erik Johd Österberg,
By Potter, Pierce
 & Schaffler,
Attorneys.

Patented Oct. 29, 1940

2,219,429

UNITED STATES PATENT OFFICE 2,219,429

COMPUTING DEVICE

Erik Jakob Österberg, Ornskoldsvik, Sweden

Application July 26, 1938, Serial No. 221,421
In Sweden August 2, 1937

1 Claim.  (Cl. 235—61)

The present invention refers to computing devices adapted to facilitate the calculation of surfaces or volumes from a structural drawing made to a certain scale wherein, as is well known, most of the surfaces, such as floors, walls, façades and so forth are parallelogram-shaped. As will be described more fully in the following, the panes in question render possible direct reading of a sought volume or area, without any calculating operation whatever having to be performed. The invention therefore entails considerable saving of time in these calculations.

The measurements that are of the greatest interest are the establishment of the volume of a room, which in the drawing is rendered by a parallelogram, and also the establishment of the area of the walls of this room.

An object is to provide a calculating device for use with structural drawings to obtain data as to the areas of parallelograms on the drawings and the volumes corresponding to such areas and a third linear dimension; the calculating device including a transparent plate carrying two axes that are to be placed over adjacent sides of the parallelogram on the drawings, a series of curves corresponding to areas, and a slide movable parallel to one axis of the plate and along a scale graduated in the third linear dimension, the slide having a volume scale extending across the curves. More specifically, an object is to provide a calculating device of the type stated for use with architectural drawings, the several curves being marked in values of floor or wall areas, and the scale for setting the slide being graduated values of dimension of the room measured perpendicular to the surface area represented by the curves.

These and other objects and advantages of the invention will be apparent from the following specification when taken with the accompanying drawing in which the single figure is a plan view of one embodiment of the invention.

As is well known, hyperbola curves with perpendicular axes may be used for the measuring of rectangular surfaces. I designates a pane of some transparent material, the same being provided with a great number of symmetrical hyperbolas 2 with perpendicular asymptotes 3, 4. The pane may be placed directly over the figure to be measured, such as a rectangle A shown with dotted lines in the accompanying drawing, it being assumed that said rectangle represents the contours of a room in a structural drawing. The pane is then positioned in such a manner that the point of intersection 5 of the asymptotes meets with a corner of the rectangle, so that the asymptotes coincide with two of the sides of the rectangle. At the corner diagonally opposed to that beneath the point of intersection of the asymptotes, the area of the rectangle may be read off directly on the hyperbola $2a$ touched by the said corner, provided the hyperbolas are marked with numerals indicating the surface represented by each hyperbola at the scale to which the rectangle A is drawn.

Along the one asymptote 4, the distance $$\frac{1}{h}$$

is then plotted from the point of intersection of the asymptotes, $h$ indicating, to an arbitrarily selected scale, the height of the parallelepiped the volume of which is to be measured. Thus a scale of height 6 is obtained along this asymptote. A line drawn at right angles to the asymptote 4 from the value of the height of a certain surface indicates the volumes sought by its length from the asymptote to the point of intersection with the hyperbola indicating the area of the surface. Instead of drawing a line in each particular case and measuring the length thereof, the invention provides for a runner 8 fitted with a volume scale 7, which runner may be displaced in a direction paralleling the asymptote at which the scale of height is drawn. If it be assumed that a certain surface Y of the height $h$ has the volume V, then the equation $$V \cdot \frac{1}{h} = Y$$

holds good for the Y-hyperbola, since this hyperbola is the locus of the corner point of all rectangles of the surface Y and placed in the manner set forth. From this will be obtained $V = h.Y$, that is to say, the volume is equal to the product of the height and the base surface, which shows that the principle of graduation is correct. This proof also shows that the scales of height and volume may exchange their places. It is preferable, however, as aimed at by the invention, to locate the scale of height to the pane and the scale of volume to the runner.

Like the pane 1, the runner 8 is preferably made from transparent material, so that the curves 2 will be visible right through the same. In the drawing, it is shown to be non-transparent only in order to render the graduation thereon clearer.

The runner 8 is displaceable in guides 9, which are preferably constituted by channel-shaped metal bars which are screwed, riveted or otherwise fastened to the pane 1 in parallel to the graduated asymptote 4. The guides may also consist of Celluloid like the pane, and may be secured to the latter by first dissolving the bearing surfaces with the aid of acetone. If desired, the runner may be lined with metal at the ends thereof, in case it consists of Celluloid, for example.

As stated, the hyperbolas drawn on the pane are provided with numerals indicating the surface they represent for a certain scale in the drawing on which the measurement is to be performed. These surface numerals are preferably placed at the center of the hyperbolas along the real axes of the hyperbolas, as shown in the drawing. They may of course also be placed at other points of the curves.

In the example illustrated, it is assumed that the drawing on which the measurement is to take place is drawn to the scale 1:100, and that the hyperbolas are graduated in square metres.

The scale of height is graduated in metres and, consequently, the scale of volume on the runner is graduated in cubic metres.

A rectangle A, which represents a room to be measured in a structural drawing to the scale 1:100, is placed in the manner above described, the area thereof being read off at the corner 10. If the given height, such as the ceiling height of the room, is 2.20 m. the scale of the runner 8 is adjusted opposite the value 2.20 on the scale of height 6, which is obviously graduated directly in the height $h$ and not in the inverted value $$\frac{1}{h}$$

of the latter. The volume sought is read off opposite the hyperbola 2a indicating the area of the rectangle A. It is preferred also to arrange a scale of height on the upper side of the pane, as this makes for a control of the proper position of the runner relatively to the curves and the scales.

The curves and scales are printed in colour directly on the pane, preferably on the lower side thereof.

It will be seen from the above, also, that the measuring device may be used for graphic division. It is thus possible for instance to start from a certain volume and, with a knowledge of the height, to read off the corresponding base surface directly, or vice versa.

The arrangement described may obviously also be applied for the measuring of oblique-angled parallelograms or of triangles. A condition here is obviously that the asymptotes form the same angle between them as do two sides of the parallelogram and the triangle respectively.

What I claim is:

A device for measuring the area of a base surface of parallelogram shape on structural drawings and for computing volumes from such measured base area and the height of the space above the measured area, said device comprising a plate of transparent material displaying a series of symmetrical hyperbolas and two base lines consisting of the common asymptotes of said hyperbolas, the angle between said base lines being equal to the angle between adjacent sides of the base surface to be measured and said curves representing the area, a slide extending across said series of hyperbolas, means supporting the slide for movement on said plate parallel to one of said base lines, cooperating indicia on said slide and transparent plate for setting said slide with respect to the origin of the base lines, one of said indicia comprising a scale graduated in values of the height above the measured base surface, and a volume scale on said slide to be read by following the curve, determinative of the area, to the scale.

ERIK JAKOB ÖSTERBERG.